United States Patent
Yamazaki et al.

(10) Patent No.: US 8,571,359 B2
(45) Date of Patent: Oct. 29, 2013

(54) IMAGE PROCESSING DEVICE, METHOD AND STORAGE MEDIUM FOR STORING AND DISPLAYING AN ELECTRONIC DOCUMENT

(75) Inventors: Taeko Yamazaki, Kawasaki (JP); Tomotoshi Kanatsu, Tokyo (JP); Makoto Enomoto, Kawasaki (JP); Kitahiro Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 12/486,245

(22) Filed: Jun. 17, 2009

(65) Prior Publication Data

US 2009/0324080 A1 Dec. 31, 2009

(30) Foreign Application Priority Data

Jun. 30, 2008 (JP) ................................ 2008-171178

(51) Int. Cl.
| | | |
|---|---|---|
| G06K 9/03 | (2006.01) | |
| G06K 9/54 | (2006.01) | |
| G06K 9/60 | (2006.01) | |
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |

(52) U.S. Cl.
USPC ............ 382/309; 382/305; 382/310; 715/255

(58) Field of Classification Search
USPC .......... 382/100, 305, 309–311; 715/243, 246, 715/255, 256; 235/437
See application file for complete search history.

(56) References Cited

U.S. PATENT DOCUMENTS

| 5,509,092 A | * | 4/1996 | Hirayama et al. ............ 382/301 |
|---|---|---|---|
| 6,043,823 A | | 3/2000 | Kodaira et al. ............... 345/433 |
| 6,404,921 B1 | | 6/2002 | Ishida .......................... 382/197 |

(Continued)

FOREIGN PATENT DOCUMENTS

| JP | 9-91450 | 4/1997 |
|---|---|---|
| JP | 11-167532 | 6/1999 |

(Continued)

OTHER PUBLICATIONS

Robert et al. ("Image and Text Coupling for Creating Electronic Books from Manuscripts," Proc. 4th Int'l Conf. on Document Analysis and Recognition (1997), vol. 2, pp. 823-826).*

Japanese Office Action issued May 22, 2012, in counterpart Japanese application No. 2008-171178.

*Primary Examiner* — Yubin Hung
(74) *Attorney, Agent, or Firm* — Fitzpatrick, Cella, Harper & Scinto

(57) ABSTRACT

Character code data and vector drawing data are both listed and provided in a re-editable manner. Electronic data is generated in which information obtained by vectorizing character areas in an image and information obtained by recognizing characters in the image are stored in respective storage locations. As for the electronic data generated in this manner, because character code data and vector drawing data generated from the input image are both presented by a display and edit program, a user can immediately utilize the both data.

10 Claims, 14 Drawing Sheets

(56) References Cited

U.S. PATENT DOCUMENTS

| | | | |
|---|---|---|---|
| 7,170,647 B2 | 1/2007 | Kanatsu | 358/453 |
| 7,277,584 B2 | 10/2007 | Nakanishi et al. | 382/218 |
| 7,298,900 B2 | 11/2007 | Kanatsu | 382/176 |
| 7,317,833 B2 | 1/2008 | Kaneda | 382/176 |
| 7,382,939 B2 | 6/2008 | Kanatsu | 382/305 |
| 2005/0138160 A1* | 6/2005 | Klein et al. | 709/223 |
| 2005/0238244 A1 | 10/2005 | Uzawa | 382/242 |
| 2005/0273711 A1* | 12/2005 | Herzman et al. | 715/522 |
| 2006/0171587 A1 | 8/2006 | Kanatsu | 382/173 |
| 2007/0127049 A1* | 6/2007 | Bystrom et al. | 358/1.13 |
| 2007/0133031 A1* | 6/2007 | Takaragi et al. | 358/1.13 |
| 2007/0230810 A1 | 10/2007 | Kanatsu | 382/243 |
| 2007/0237401 A1* | 10/2007 | Coath et al. | 382/232 |
| 2008/0080769 A1 | 4/2008 | Kanatsu | 382/176 |

FOREIGN PATENT DOCUMENTS

| | | |
|---|---|---|
| JP | 3026592 | 1/2000 |
| JP | 2005-346137 | 12/2005 |
| JP | 2007-272601 | 10/2007 |
| JP | 2008-092419 A | 4/2008 |

\* cited by examiner

| DATA | STORAGE LOCATION |
|---|---|
| CHARACTER RECOGNITION DATA | TEXT EDITING DATA |
| VECTOR DATA | LAYOUT EDITING DATA |

FIG. 4

| DATA | | STORAGE LOCATION |
|---|---|---|
| CHARACTER-RECOGNIZED DATA | | TEXT EDITING DATA |
| CHARACTER DATA WITH LAYOUT | HIGH RECOGNITION RATE | FOR LAYOUT EDITING (FOR CHARACTER DATA 1 WITH LAYOUT) |
| | LOW RECOGNITION RATE | FOR LAYOUT EDITING (FOR CHARACTER DATA 2 WITH LAYOUT) |
| VECTOR DATA | | FOR LAYOUT EDITING |
| BACKGROUND DATA | | FOR LAYOUT EDITING |

FIG. 9

```
<Document>
<Layout>
<HighRecognitionText>
  <String Size="48" X="49" Y="252">DOCUMENT</String>
  <String Size="20" X="720" Y="900">PHOTO</String>
</HighRecognitionText>
<LowRecognitionText>
  <String Size="28" X="70" Y="520">THIS IS A SAMBLE OF
</String>
  <String Size="28" X="70" Y="715">AN ELECTRONIC DOCUMENT
</String> </LowRecognitionText>
<Background>
<image xlink:href="data:image/jpeg:base64,/9j
/4AAQSkZJRgAB..."/>
</Background>
<Vector>
<Path d="M629 30.510.5 0.512 111 115 2.511 1v ...1-
1.0 0.5z"/>
...
</Vector>
</Layout>
<Text>
  <String>DOCUMENT </String>
  <String>THIS IS A SAMBLE OF</String>
  <String>AN ELECTRONIC DOCUMENT</String>
  <String>PHOTO </String>
</Text>
</Document>
```

FIG. 10

| DATA | | STORAGE LOCATION |
|---|---|---|
| CHARACTER-RECOGNIZED DATA | | TEXT EDITING DATA |
| CHARACTER DATA WITH LAYOUT | HIGH RECOGNITION RATE | FOR LAYOUT EDITING (FOR CHARACTER DATA 1 WITH LAYOUT) |
| | LOW RECOGNITION RATE | FOR LAYOUT EDITING (FOR CHARACTER DATA 2 WITH LAYOUT) |
| VECTOR DATA | | FOR LAYOUT EDITING |
| BACKGROUND DATA | | FOR LAYOUT EDITING |

FIG. 12

IMAGE PROCESSING DEVICE, METHOD AND STORAGE MEDIUM FOR STORING AND DISPLAYING AN ELECTRONIC DOCUMENT

BACKGROUND OF THE INVENTION

1. Field of the Invention

The present invention relates to an image processing device for processing document images.

2. Description of the Related Art

Recently, as network such as represented by Internet being widespread, documents are commonly distributed in electrical form. On the other hand, it is still common that they are distributed in paper form. Thus, various techniques have been provided for obtaining reusable electronic data from paper documents even if the existing is only a paper document.

For example, a technique is known in which a document image obtained by scanning a paper document is sent from a terminal to a server, subjected to character-recognition on the server, converted into a reusable format, and then returned to the terminal (see the Japanese Patent Laid-Open No. H11-167532 (1999)).

Additionally, another technique is also known that allows for dividing a document image into areas corresponding to their type and outputting them individually (see the Japanese Patent Laid-Open No. H11-167532 (1999)).

Although the format of data that users want to reuse depends on the situation, it is desirable that the format is easy to extract data for the users. In addition, as character recognition techniques have certain limitations, characters may potentially be falsely recognized. If the recognition of a reusable content is less-accurate, the content will be awkward to use for the users. In the technique disclosed in the Japanese Patent Laid-Open No. H11-167532 (1999), only information of the data with character format is reusable, and the information is converted without considering any recognition accuracy. However, as for paper documents, not only the content itself of the document but also the layout or positional relationship of the content often have important meanings for reusing.

Additionally, the technique disclosed in the Japanese Patent Laid-Open No. H09-091450(1997) divides a document into contents and outputs them individually, thus the relationship between them might be lost.

Furthermore, it is also another challenge to enable users easily to reuse character images contained in a image as vector data and to reuse the character images as character codes after character recognition.

SUMMARY OF THE INVENTION

An image processing device of the present invention includes: an analyzing unit for analyzing an image and extracting character areas; a character recognition unit for recognizing characters in the character areas extracted by the analyzing unit and obtaining character code data of the recognition result; a vectorization unit for vectorizing the character areas extracted by the analyzing unit and obtaining vector drawing data; a storage location determination unit for determining, in an electronic document, storage locations of the character code data obtained by the character recognition unit and the vector drawing data obtained by the vectrization unit; and an electronic document generation unit for generating the electronic document having the character code data and the vector drawing data in the storage locations determined by the storage determination unit.

According to the techniques of the present invention, users can easily utilize desired data since both character code data of the recognition result of character areas and vector drawing data are provided. In addition, the recognition result can be provided in a re-editable form. Furthermore, as each of the vector drawing data is arranged in the same layout as the input image, users can view the positional relationship between vector drawing data of each of the character areas in an understandable manner, thus can easily browse or edit the data.

Further features of the present invention will become apparent from the following description of exemplary embodiments (with reference to the attached drawings).

BRIEF DESCRIPTION OF THE DRAWINGS

FIG. 4 illustrates a determination rule used for determining the storage location of data according to the first embodiment of the present invention;

FIG. 9 illustrates a determination rule used for determining the storage location of data according to the second embodiment of the present invention;

FIG. 10 illustrates a specific example of an electronic document generated for the input image of the FIG. 8 according to the second embodiment of the present invention;

FIG. 12 illustrates a determination rule used for determining the storage location of data according to the third embodiment of the present invention;

DESCRIPTION OF THE EMBODIMENTS

First Embodiment

In the following, a preferred embodiment of the present invention will be described with reference to the drawings. It will be understood, however, that any configurations described in the embodiment is exemplary only and that the scope of the present invention should not be limited to the configurations.

[System Configurations]

First, the whole configuration of a system including an image processing device according to the first embodiment of the present invention will be described with reference to FIG. 1.

Figure 1:
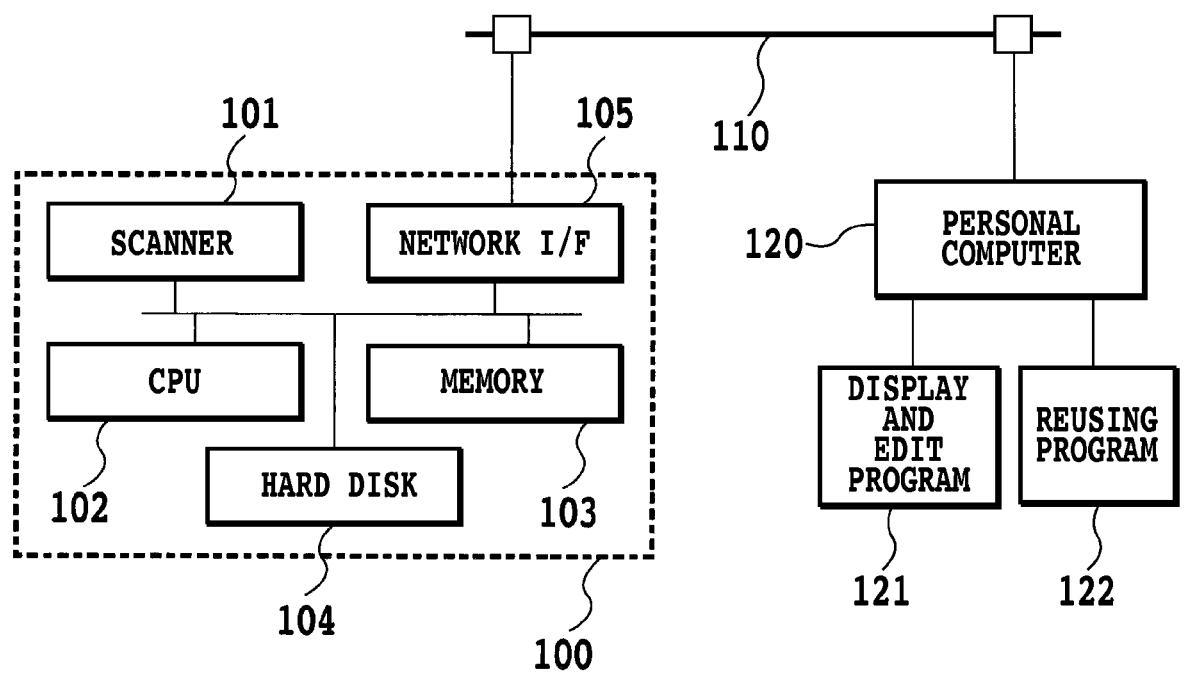
FIG. 1 illustrates an exemplary system configuration according to the first embodiment of the present invention.

FIG. 1 illustrates an exemplary system configuration according to the first embodiment of the present invention.

In FIG. 1, image processing device 100 is composed of following components. Scanner 101 reads a document and converts it to corresponding image data. CPU 102 executes an electronic document generation program to apply image processing described below to the image data obtained from the scanner 101, or other programs. Memory 103 is used as a work memory or a temporary storage memory when CPU 102 executes those programs. Hard disk 104 stores those programs and data. In addition, network interface 105 being a network I/F inputs/outputs data from/to external devices. Note that image processing device 100 may be a multifunction peripheral having useful functions of a fax, a copying machine or a printer in addition to scanner 101.

Personal computer (PC) 120 is connected to an image processing device 100 via a network such as LAN 110 and receives data sent from the image processing device 100. Display and edit program 121 may be executed on PC 120 that is able to display the received electronic document on the screen and edit the document, and another reuse program 122 may utilize portions of the document on the PC.

[Overview of Image Processing Device 100]

Next, the overview of image processing device 100 according to the first embodiment will be described with reference to FIG. 2.

Figure 2:
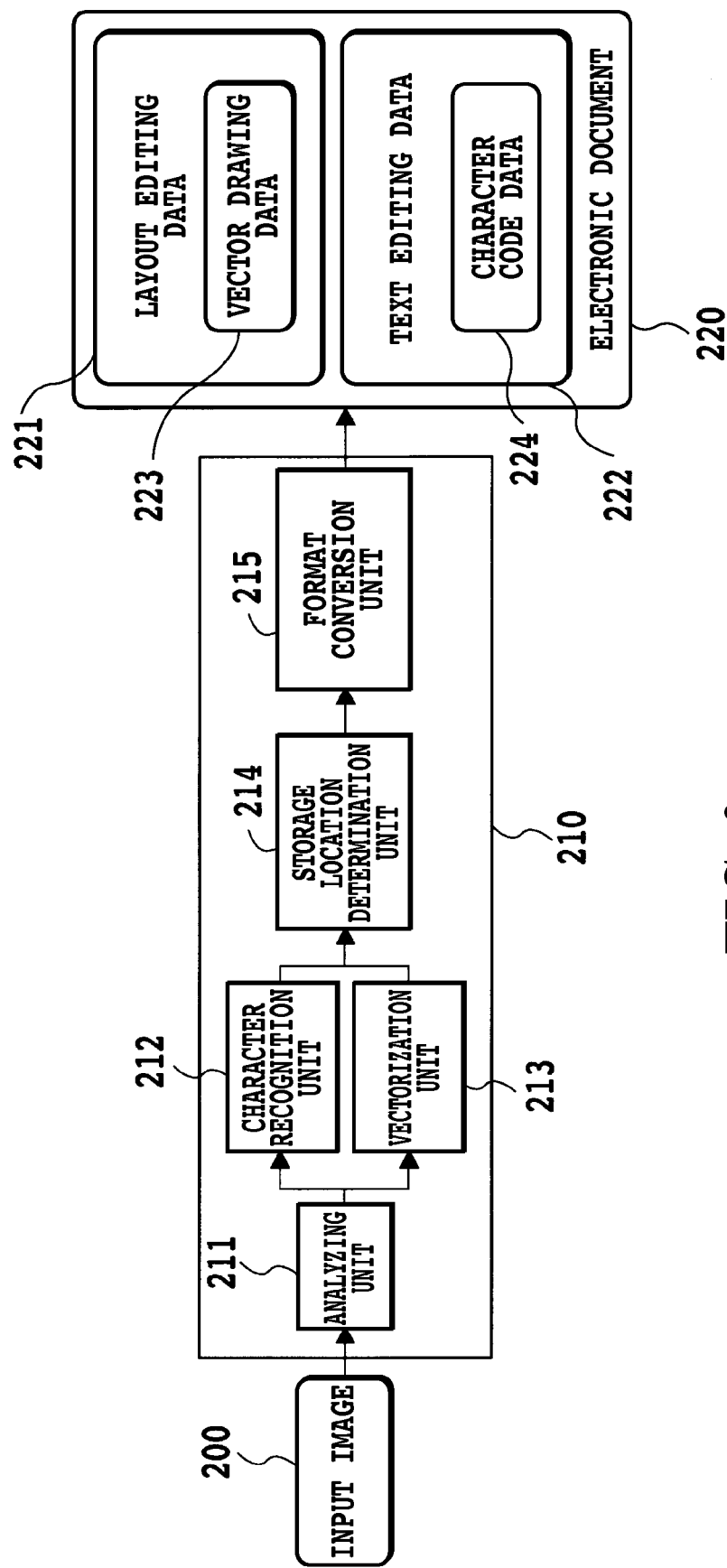
FIG. 2 illustrates a block diagram showing a configuration associated with electronic document generation of an image processing device and input/output data according to the first embodiment of the present invention.

FIG. 2 illustrates a block diagram showing a configuration associated with electronic document generation of image processing device 100 and input/output data according to the first embodiment of the present invention.

In the embodiment, although each process illustrated in FIG. 2 is performed by CPU 102 executing the electronic document generation program, a part or all of the execution may be configured by an electronic circuit.

In FIG. 2, input image 200 is input from scanner 101. Note that although the input image is input from a scanner in the embodiment, the image should not be so limited and may be that received from a fax.

An electronic document generation unit (electronic document generation program) 210 generates an electronic document from the above input image.

An electronic document 220 is generated by electronic document generation unit 210.

The blocks 211 to 215 schematically illustrate each process executed by electronic document generation unit 210, which are described in more detail below.

An analyzing unit 211 analyzes input document images to extract their character areas.

A character recognition unit 212 character-recognizes the character areas extracted by analyzing unit 211 and converts the recognized characters into character code data.

A vectorization unit 213 extracts outline information of each character contained in the character areas extracted by analyzing unit 211 and converts the extracted outline information into vector drawing data.

A storage location determination unit 214 determines, in electronic document, storage locations of the character code data of electronic document 220 obtained from the character recognition unit 212 and the vector drawing data of electronic document 220 obtained from the vectorization unit 213.

A format conversion unit 215 converts the formats of character code data and vector drawing data into those of electronic document 220 according to the storage locations determined by storage determination unit 214 to generate electronic document 220.

The electronic document 220 generated by the electronic document generation unit 210 is composed of each of the data 221 to 224 described below, and may be displayed and edited by display and edit program 121 in PC 120.

A layout editing data 221 is used in display and edit program 121 and stores vector drawing data 223 generated by the vectorization unit 213. In addition, text editing data 222 is used in display and edit program 121 and stores character code data 224 after the recognition of character recognition unit 212.

Processing Example by an Electronic Document Generation Unit

In the following, a case in which electronic the document generation unit 210 processes input image 300 of FIG. 3 as input image 200.

The analyzing unit 211 extracts a character area in input image 200 using well known image analyzing techniques. Specifically, the analyzing unit 211 extracts pixel clusters respectively composing each character in an image, and then extracts as a character area from the clusters an area in which each cluster has a size of a character and the clusters are aligned either at least vertically or horizontally. As a way of extracting a pixel cluster of character, any of well known methods may be used including: extracting a pixel cluster of analogous color pixels from input multi-valued image; extracting a pixel cluster of black pixels obtained by binalizing the multi-valued images; or extracting pixels enclosed by edges obtained by generating differential edge information from the multi-valued images.

Figure 3:
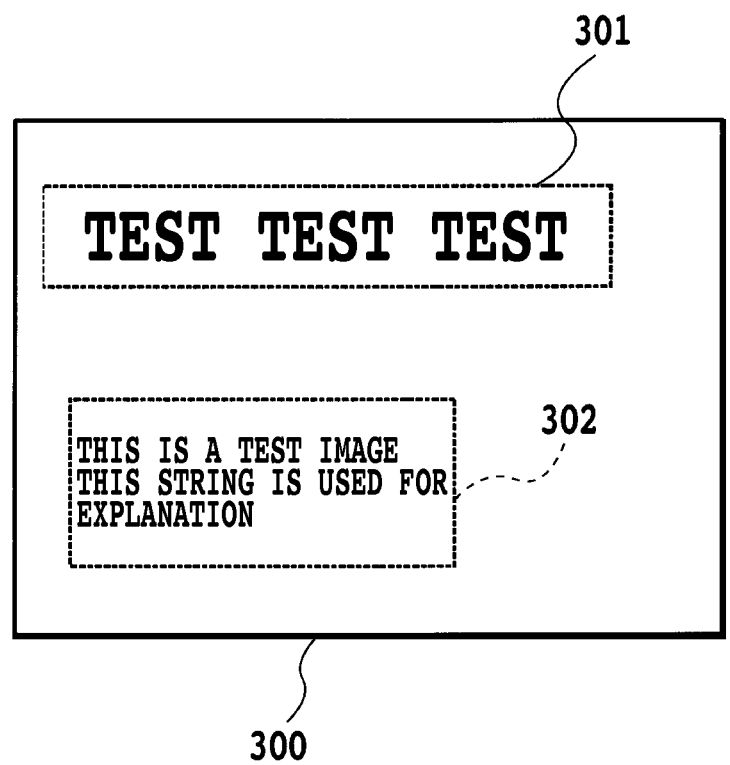
FIG. 3 illustrates an input image used for describing the first embodiment of the present invention.

In the example of image 300 illustrated in FIG. 3, areas 301 and 302 enclosed by dotted lines are to be extracted as character areas. The character recognition unit 212 recognizes characters in each character area using well known character recognition techniques to generate character code data.

Now, an exemplary character recognition process will be briefly described. However, it will be understood that the description is an example only, and any other recognition processes may be used for the purpose.

In a character recognition process, whether characters are written vertically or horizontally in a character area, that is, their line direction is determined. To achieve this, a method may be used that binarizes an image, generates the vertical and horizontal projection of the image, and then determines the one having lower variance to be the line direction.

Then the image is divided into separate character images. This may be achieved by determining line spaces to be divided using the horizontal projection of the binary image and dividing the image into line images, and then determining character spaces to be divided using the vertical projection of the image and dividing each of the line images into character images.

Then predetermined feature amount is calculated for each one of the character images. Then a dictionary pre-storing the feature amount of all character images will be searched for the most similar character to the character image. The character code of the character is the recognized result of each character image.

In the example illustrated in FIG. 3, two character code data have been generated that correspond respectively to a string "TEST TEST TEST" as a result of recognizing character area 301 and another string "THIS IS A TEST IMAGE. THIS STRING IS USED FOR EXPLANATION" as a result of recognizing character area 302.

The vectorization unit 213 utilizes well known vectorization techniques to generate vector drawing data of characters from image data in each character area. Methods disclosed in the Japanese patent document 3026592 or the Japanese Patent Laid-Open No. 2005-346137 are examples of the vectorization techniques.

For example, the method disclosed in the Japanese patent No 3026592, with raster-scanning an image, detects the horizontal and vertical inter-pixel vectors based on the condition of a focused pixel and the neighboring pixels of the image. Next, by extracting outlines of the image data based on the connection conditions between each of the inter-pixel vectors, information called outline vector is generated that describes the outline of the connected pixel data with a set of inter-pixel vectors. In addition, the method disclosed in the Japanese Patent Laid-Open No. 2005-346137 generates vector description data that remains to be high quality even when significantly magnified, by approximating outline vectors using straight lines, or two- or three-dimensional Bezier curves.

The storage location determination unit 214 determines the storage locations of character code data and vector drawing data based on a determination rule specifying data storage locations such as illustrated in FIG. 4. That is, the storage location of character code data is determined as text editing data 224 in electronic document 220 and that of vector drawing data is determined as layout editing data 221 in the electronic document 220.

The format conversion unit 215 converts the formats of character code data and vector drawing data into those according to the storage location determined by the storage location determination unit 214 to generate electronic document 220.

Specific Example of an Electronic Document

Now, a specific example of an electronic document according to the first embodiment of the present invention will be described with reference to FIG. 5.

Figure 5:
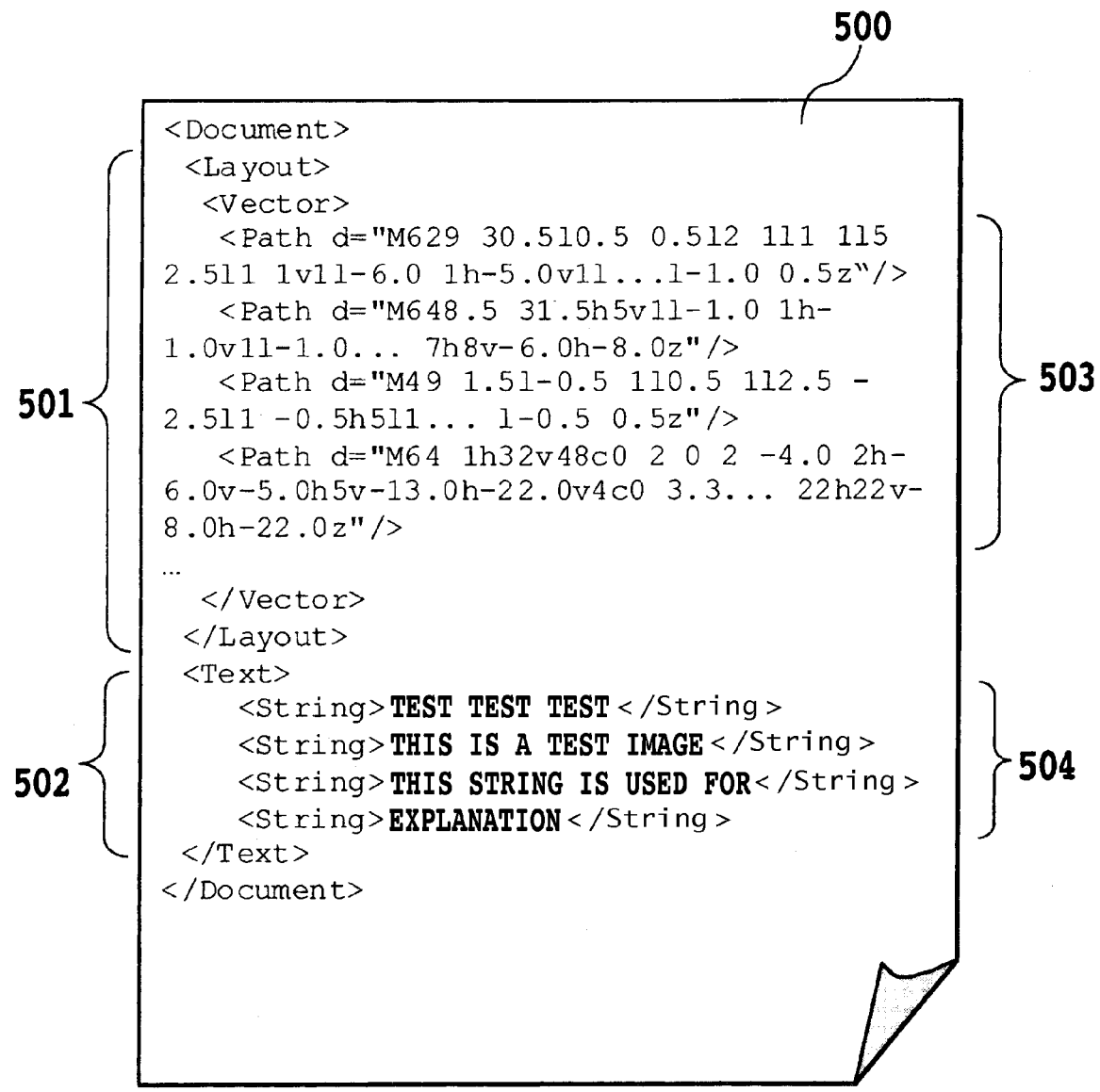
FIG. 5 illustrates a specific example of an electronic document generated for the input image of FIG. 3 according to the first embodiment of the present invention.

Electronic document 500 illustrated in FIG. 5 represents a specific example of electronic document 220 generated according to a XML format for illustrating the embodiment.

A partition 501 in FIG. 5, enclosed by elements <Layout> and </Layout>, contains layout editing data of an electronic document. The partition 501 also contains vector drawing data 503. Here, it is assumed that the location information of each object (character) of the vector drawing data is also specified such that the object can be drawn in the same layout of the input image.

On the other hand, a partition 502, enclosed by elements <Text> and </Text>, contains text editing data of an electronic document. The partition 502 also contains character code data 504 obtained as a result of character recognition.

Here, the name and data structure of elements complies with the specification of display and edit program 121. Depending on the type of display and edit program 121, the electronic document may be output with names or data structures other than those illustrated in FIG. 5.

When display and edit program 121 is a "PowerPoint" application program of MICROSOFT CORPORATION, vector drawing data 503 is displayed in a slide area (slide pane) and character recognition result is displayed in a note area (note pane). In this case, electronic document 500 is formatted with "pptx".

An Example Screen by a Display and Edit Program

Next, an example screen of electronic document 500 of FIG. 5 will be illustrated with reference to FIG. 6 that is an example of electronic document 220 generated from image 300 of FIG. 3 and is processed by display and edit program 121 running on personal computer 120 of FIG. 1.

Figure 6:
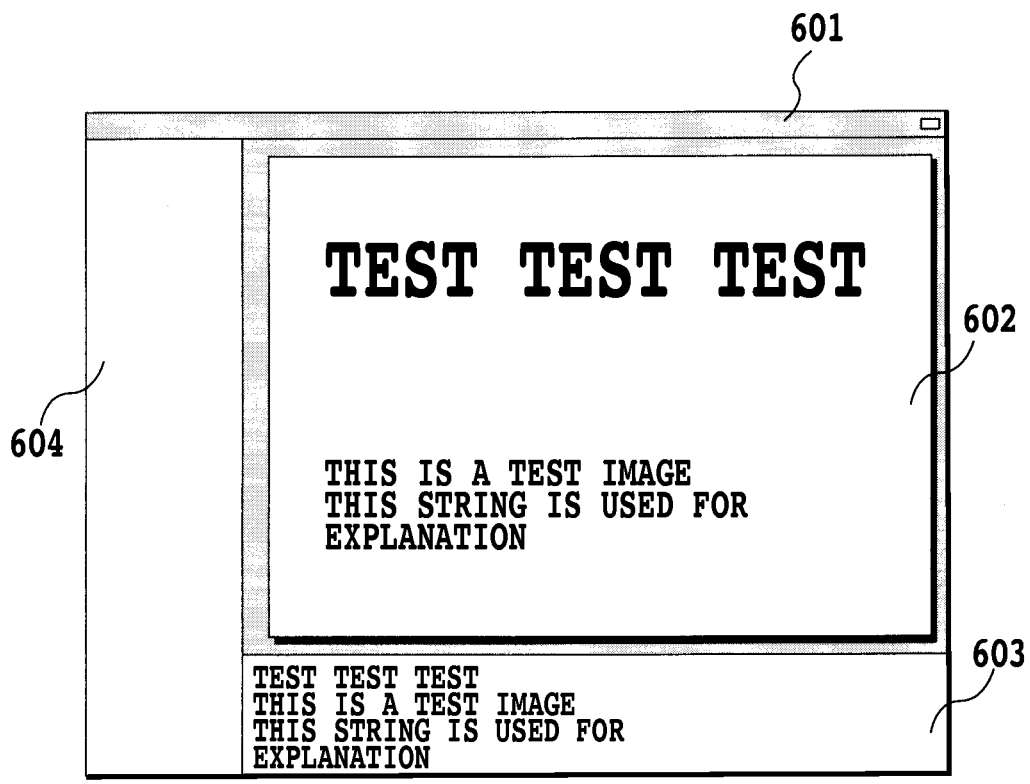
FIG. 6 illustrates an exemplary screen obtained by inputting the electronic document of the FIG. 5 into a display and edit program according to the first embodiment of the present invention.

FIG. 6 illustrates an example screen of electronic document 500 fed into display and edit program 121.

Display window 601 shows a whole display window obtained by display and edit program 121. Display window 601 includes layout editing window 602, text editing window 603, and summary information display window 604. If display and edit program 121 is a Power Point program, layout editing window 602 corresponds to a slide pane, text editing window 603 to a note pane, and summary information display window 604 to an outline pane.

Layout editing window 602 displays the content of layout editing data 221 in electronic document 220. As for electronic document 500 of FIG. 5 illustrated in the embodiment, image information whose appearance is identical to that of areas 301 and 302 of FIG. 3 is depicted using vector drawing data 503.

On layout editing window 602, a user can scale objects drawn with vector drawing data or change the color information of the object. Further, the user can store an edited electronic document or print an electronic document exactly as in displayed in layout editing window 602.

Text editing window 603 displays the content of text editing data in electronic document 220 as text data. As for electronic document 500 of FIG. 5 illustrated in the embodiment, strings of the content of character code data 504, i.e., a string "TEST TEST TEST" obtained by character-recognizing area 301 of FIG. 3, and a string "THIS IS A TEST IMAGE. THIS STRING IS USED FOR EXPLANATION" obtained by character-recognizing area 302 of FIG. 3 are displayed sequentially.

A user may use the content displayed on text editing window 603 as a complementary information such as annotations or comments of a document displayed on layout editing window 602. Furthermore, the content displayed on the window 303 may be edited as text data.

Summary information window 604 displays, of the content of layout editing data 221 in electronic document 220, character information of data used for summary information. However, as data used for summary information does not exist in electronic document 500 of FIG. 5 illustrated in the embodiment, empty content is displayed as illustrated in FIG. 6.

As described above, the image processing device according to the embodiment generates electronic data in which information obtained by vectorizing character areas of an image and those obtained by recognizing characters in the image are stored in respective locations. As character code data and vector drawing data of data generated from the input image are both presented on a display screen of display and edit program 121, a user can immediately utilize both of the data. That is, in the embodiment, both character code data and vector drawing data of the recognition result of character areas may be listed and provided in a re-editable manner. Furthermore, as each vector drawing data is arranged in the same layout as the input image, the location relationship between vector drawing data of each character area is displayed in an easily understood manner for a user, and the user can easily browse or edit the data.

Second Embodiment

Next, an image processing device according to a second embodiment of the present invention will be described with reference to FIG. 7.

Figure 7:
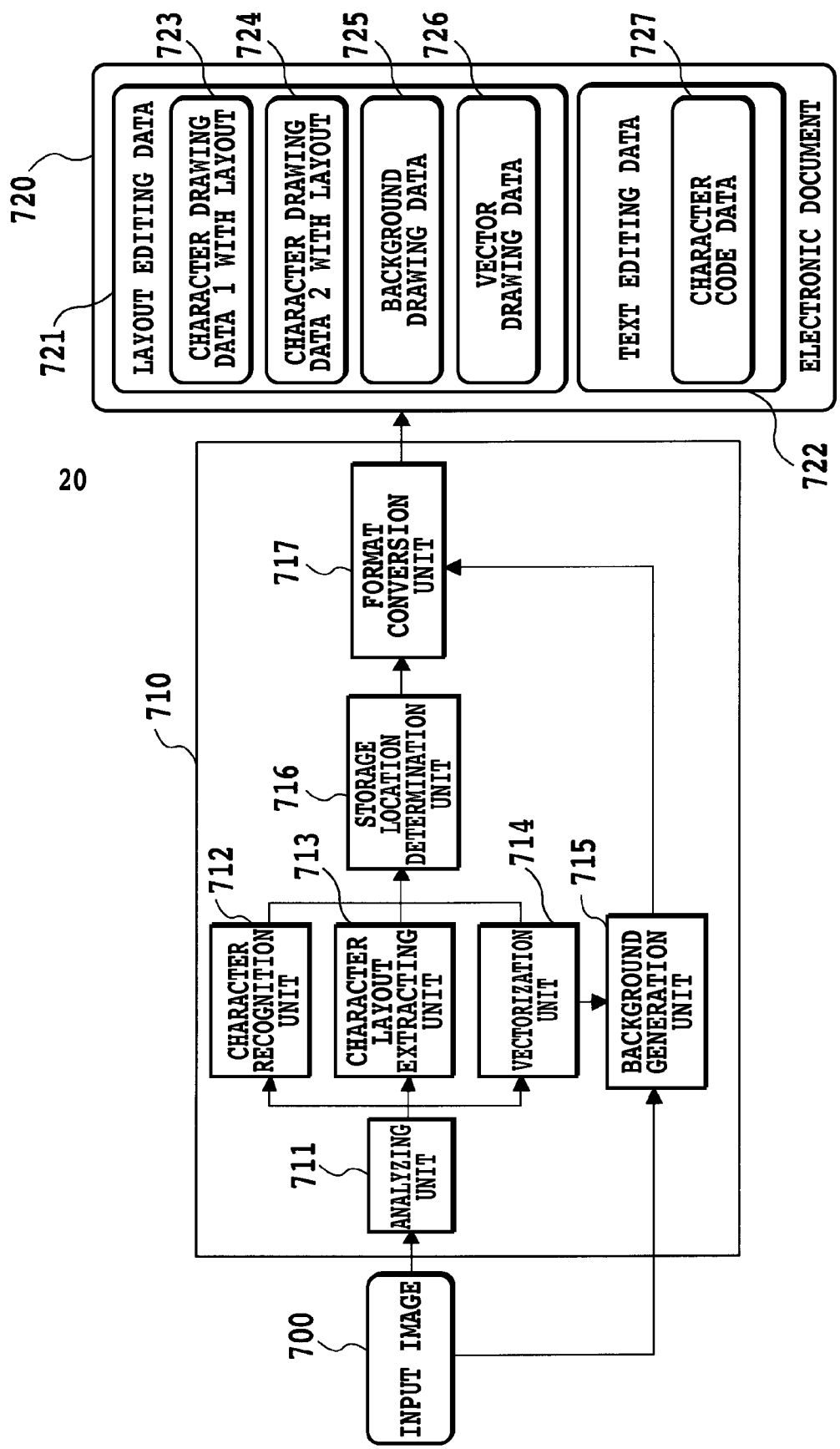
FIG. 7 illustrates a block diagram showing a configuration associated with electronic document generation of an image processing device and input/output data that are configured in the same way as those in the first embodiment, according to the second embodiment of the present invention.

FIG. 7 illustrates a block diagram showing a configuration associated with electronic document generation of an image processing device and input/output data, those are configured similarly to FIG. 1.

Similarly to FIG. 2, although each process is performed by CPU 102 executing the electronic document generation program, a part or all of the operation may be performed by an electronic circuit.

Input image 700 is inputted from scanner 101.

An electronic document generation unit 710 generates an electronic document from the input image 700.

An electronic document 720 is generated by the electronic document generation unit 710. Blocks 711 to 717 in FIG. 7 schematically illustrate each process executed by the electronic document generation unit 710.

An analyzing unit 711 analyzes input document images and extract their character areas.

An character recognition unit 712 character-recognizes the character areas extracted by the analyzing unit 711 and converts the recognized characters into character code data.

An character layout extracting unit 713 extracts character layout information of the character area extracted by the analyzing unit 711. While the information can include, for example, coordinate of a character area, and font, size or color of a character, the coordinate of a character area and the size of a character will be extracted at least herein.

An vectorization unit 714 extracts outline information of each character contained in the character areas extracted by the analyzing unit 711 and converts the extracted information into vector drawing data.

An background generation unit 715 generates data to draw an area other than character areas in an input image, i.e., a background.

A storage location determination unit 716 determines storage locations of data in the electronic document 720. In this case, the data to be a target includes: character code data output by the character recognition unit 712; character drawing data with layout obtained by combining the character code data and character layout information; and vector drawing data output by the vectorization unit 714.

An format conversion unit 717 converts character code data, drawing data with layout, vector drawing data, and background drawing data into the respective formats of the electronic document 720.

The electronic document 720 generated by the electronic document generation unit 710 is composed of data 721 to 727 described below and may be displayed and edited by the display and edit program 121 in PC 120.

The layout editing data 721 is used in the display and edit program 121. The data 721 includes two types of character drawing data with layout 723 and 724, background drawing data 725 and vector drawing data 726.

Meanwhile, text editing data 722 is used in the display and edit program 121, which is configured by character code data 727.

Processing Example by an Electronic Document Generation Unit

In the following, a case in which electronic document generation unit 710 processes input image 801 of FIG. 8 as input image 700, is further described.

First, the analyzing unit 711 extracts character areas in input image 700. The process is similar to those of the analyzing unit 211 in FIG. 2, so the description of the process will be omitted.

As for input image 800, areas 801, 802 and 803 enclosed by dotted lines are to be extracted as character areas.

The recognition unit 712 recognizes characters in each character area to generate character code data. The process is similar to those of character recognition unit 212 in FIG. 2, so the description of the process will be omitted.

Figure 8:
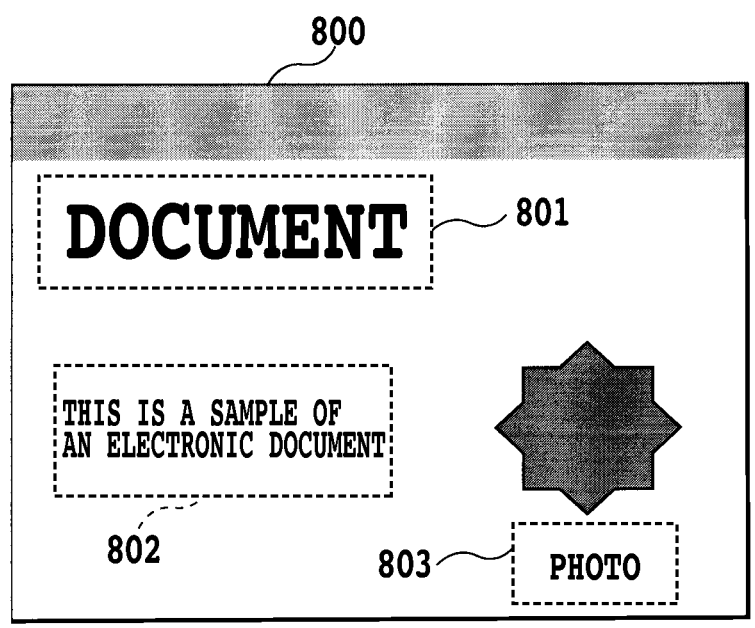
FIG. 8 illustrates an input image used for describing the second embodiment of the present invention.

Provided, from the example illustrated in FIG. 8, three character code data, "DOCUMENT", "THIS IS A SAMBLE OF AN ELECTRONIC DOOUMENT" and "PHOTO" have been obtained as a result of recognizing character areas 801, 802, 803, respectively. Note here that the recognition result of character area 802 includes falsely-recognized characters (i.e. The text images "SAMPLE" and "DOCUMENT" existed in character area 802 is Falsely-recognized as "SAMBLE" and "DOOUMENT" respectively).

Then, the character layout extracting unit 713 obtains character layout information of each character area. The information extracted here are to be coordinate information of the character area and size information of characters. Any well known extracting techniques may be used for extracting the character layout information. For example, although the coordinate information of character areas may be obtained upon the analyzing unit 711 extracting the areas, and the size of characters may be obtained as an averaged size value of the characters generated upon recognizing each of the characters by character recognition unit 712, any other methods may be used for the purpose.

Then, the vectorization unit 714 generates vector drawing data of characters from image data in each character area. The process is similar to those of the analyzing unit 213 in FIG. 2, so the description of the process will be omitted.

Then, the background generation unit 715 generates background drawing data by changing the color of pixels of character parts in a character area of the input image into a color analogous to that of a background surrounding the area. In other words, upon overplanting the character pixels of the input image with the color of the surrounding area, a background image not including the character area of the input image can be generated. Any well known techniques may be used for the process of background generation unit 715. For example, the Japanese Patent Laid-Open No. 2007-272601 discloses a technique that vectorizes characters in an input image and complements pixels in the characters with a background color.

Then, the storage location determination unit 716 determines the storage locations of character code data, character drawing data with layout, background drawing data and vector drawing data based on a determination rule specifying data storage locations, for example, as illustrated in FIG. 9.

According to the determination rule of FIG. 9, character drawing data with layout having higher character code recognition rate is determined to be stored in the layout editing data 721 in the electronic document 720 as character drawing data 1 with layout (723) (for displaying summary). On the other hand, character drawing data with layout having lower character code recognition rate is, differently with that having higher rate, determined to be stored in the layout editing data 721 in the electronic document 720 as character drawing data 2 with layout (724) (for displaying non-summary). Background drawing data and vector drawing data are determined to be stored in layout editing data 721 as background drawing data 725 and vector drawing data 726 respectively. Meanwhile, character code data is determined to be stored in text editing data 722 as character code data 727.

In determining according to the determination rule of FIG. 9, the distance between feature amount of each recognized character and those of corresponding character in a dictionary when character recognition unit 712 recognizes each character is obtained for each one of the characters. Then the distances are averaged across all of the characters in a character area. Finally, data having the averaged value less than a predetermined threshold is selected as the high character recognition rate data. That is, if the similarity of each character contained in a character area is high, then the character recognition rate (recognition reliability) will also be high. On the other hand, data having a higher average value calculated from each recognized distance than the predetermined threshold is determined to be low character recognition rate data. That is, if the similarity of each character contained in a character area is low, then the character recognition rate (recognition reliability) will also be low. This method is an example only, and any suitable method may be used for defining each character's recognition reliability to compare with a threshold. Alternatively, a recognized string having a matched word in a dictionary may be determined to be high character recognition rate data, while a recognized string not having any matched word in the dictionary may be determined to be low character recognition rate data.

The format converting unit 717 converts each data into a format in accordance with a storage location determined by the storage location determination unit 716 to build electronic document 720.

Specific Example of an Electronic Document

Now, a specific example of an electronic document according to the second embodiment of the present invention will be described with reference to FIG. 10.

Electronic document 1000 illustrated in FIG. 10 represents a specific example of electronic document 720 generated according to a virtual XML format for illustrating the embodiment.

Partition 1001 enclosed by elements <Layout> and </Layout> contains layout editing data of an electronic document. Partition 1001 also contains character drawing data 1 with layout 1003, character drawing data 2 with layout 1004, background drawing data 1005, and vector drawing data 1006.

Partition 1002 enclosed by elements <Text> and </Text> contains text editing data of an electronic document and character code data 1007.

Here, similarly to the first embodiment, the name and data structure of elements of FIG. 10 complies with the specification of the display and edit program 121. Therefore, depending on the type of the display and edit program 121, the electronic document 1000 may be output in names or data structures other than those illustrated in FIG. 10.

An Example Screen by a Display and Edit Program

Next, an example screen of the display and edit program 121 will be described with reference to FIG. 11 that is executed on the personal computer 120 shown in FIG. 1 and that processes the electronic document 1000 of FIG. 10 being a specific example of the electronic document 720 generated from image 800 of FIG. 8.

Figure 11:
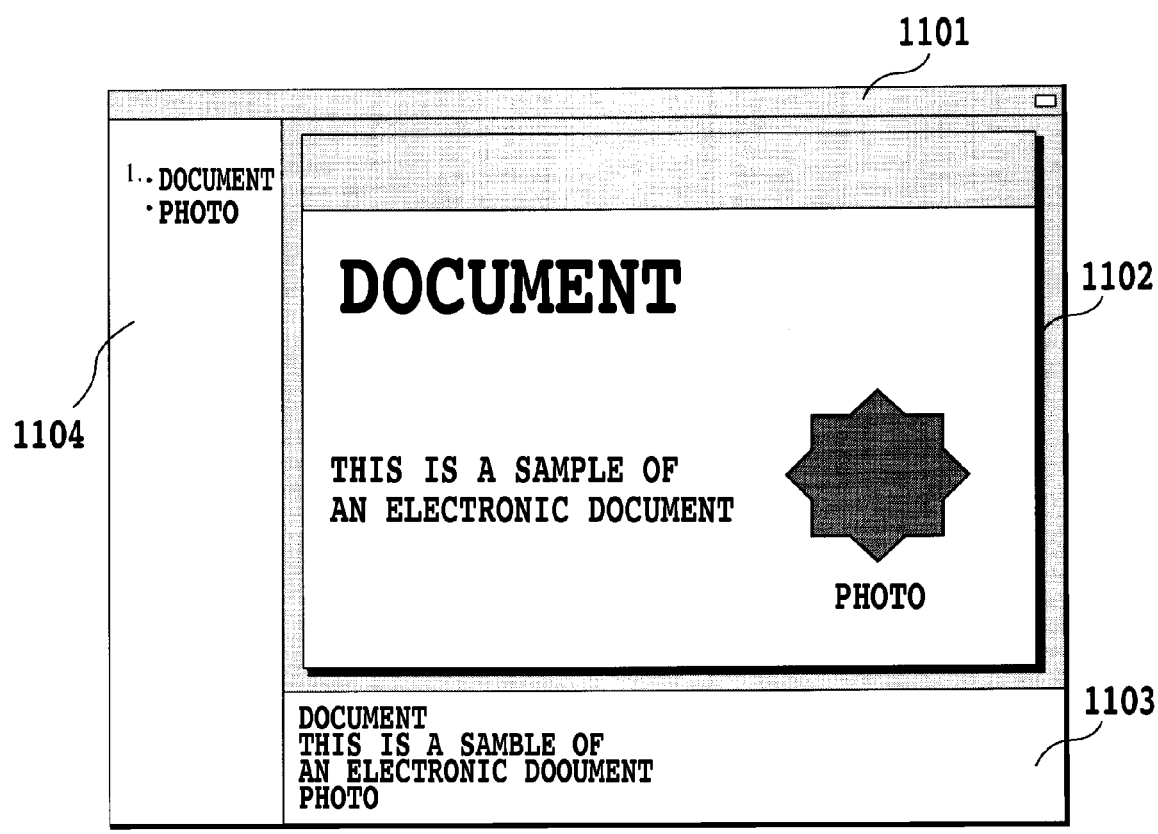
FIG. 11 illustrates an exemplary screen obtained by inputting the electronic document of the FIG. 10 into a display and edit program according to the second embodiment of the present invention.

FIG. 11 illustrates an example screen of the electronic document 1000 fed into the display and edit program 121.

A display window 1101 shows a whole display window obtained by the display and edit program 121. The display window 1101 includes a layout editing window 1102, a text editing window 1103, and a summary information display window 1104.

A layout editing window 1102 displays the content of layout editing data 721 in the electronic document 720.

In the electronic document 1000 of FIG. 10, the character drawing data with layout 1003, the character drawing data with layout 1004, the background drawing data 1005 and the vector drawing data 1006 are displayed in this order from bottom up.

Note here that the background drawing data 1005 will be placed on the character drawing data with layout 1003 and 1004. In other words, the character drawing data with layout 1003 and 1004 will be displayed with the background drawing data 1005 overlaid thereon. Therefore, a user can see the vector drawing data 1006 drawn on a background based on the background drawing data 1005. Consequently, image information whose appearance is identical to that of input image 800 of FIG. 8 is depicted using vector drawing data generated from outline information extracted from each character.

Similarly to the first embodiment previously described, in the layout editing window 1102, a user can scale objects drawn with vector drawing data or change the color information of the objects. In addition, storing edited electronic document, or printing an electronic document in exact appearance of the layout editing window 1102 are possible.

The text editing window 1103 displays the content of text editing data in electronic document 720 as text data.

As for exemplary electronic document 1000 of FIG. 10 according to the second embodiment, the text editing window 1103 displays strings of "DOCUMENT THIS IS A SAMBLE OF AN ELECTORONIC DOOUMENT PHOTO". The text editing window 1103 in FIG. 11 is used as complementary information such as a note (annotation or comment) of the document appearance displayed in the layout editing window 1102. Furthermore, the content of the same window may also be edited as text data.

The summary information window 1104 displays, out of the content of the layout editing data 721 in the electronic document 720, character code information contained in character drawing data 1 with layout (723).

Note that a display and edit program according to the embodiment defines strings of layout editing data enclosed by elements <HighRecognitionText> and </HighRecognitionText> as character 1 with layout to be displayed in the summary information window. Further, strings of layout editing data enclosed by elements <LowRecognitionText> and </LowRecognitionText> is defined as character drawing data 2 with layout not to be displayed in the summary information window. Consequently, as for the electronic document 1000 of FIG. 10 illustrated in the second embodiment, two strings "DOCUMENT" and "PHOTO" contained in partition 1003 of FIG. 10 are displayed in partition 1104 in FIG. 11 as data used for summary information.

As described above, an image processing device according to the embodiment generates electronic data in which character drawing data with layout is stored in the storage location determined according to its character recognition rate. For the above generated electronic data, the display and edit program 121 also provides summary information about high character recognition rate data, so a user can more efficiently reuse high reliability information. In other words, in the embodiment, the user can reuse high character recognition rate data without hesitation and in easy-browsing manner. Furthermore, character drawing data with layout (i.e., character codes resulting from character recognition) is drawn on the layout editing window, so that when text search being performed, found characters are highlighted, and the user can easily find the position of a desirable text on the screen.

Here, in the case of the display and edit program 121 being a Power Point program, the layout editing window 602 corresponds to a slide pane, text editing window 603 corresponds to a note pane, and summary information display window 604 corresponds to a outline pane. In this case, an electronic document is generated in which strings having higher similarity of recognized characters are written in the layout editing data part so that only such strings are displayed in the outline pane.

Third Embodiment

Now, the third embodiment of the present invention will be described.

In the above second embodiment, the storage location determination unit 716 has determined storage locations according to the determination rule of FIG. 9. In the third embodiment, with similar configuration to that of the second embodiment, the storage locations are to be determined based on a determination rule illustrated in FIG. 12.

In the third embodiment, character drawing data with layout having higher character recognition rate of character codes will be stored as character drawing data 1 with layout (723) in the layout editing data 721 in the electronic document 720. On the other hand, character drawing data with layout having lower character recognition rate of character codes will be, after eliminating character code information, stored as character drawing data 1 with layout (723) in the layout editing data 721 in the electronic document 720.

Specific Example of an Electronic Document

Now, a specific example of an electronic document according to the third embodiment of the present invention will be described with reference to FIG. 13.

Figure 13:
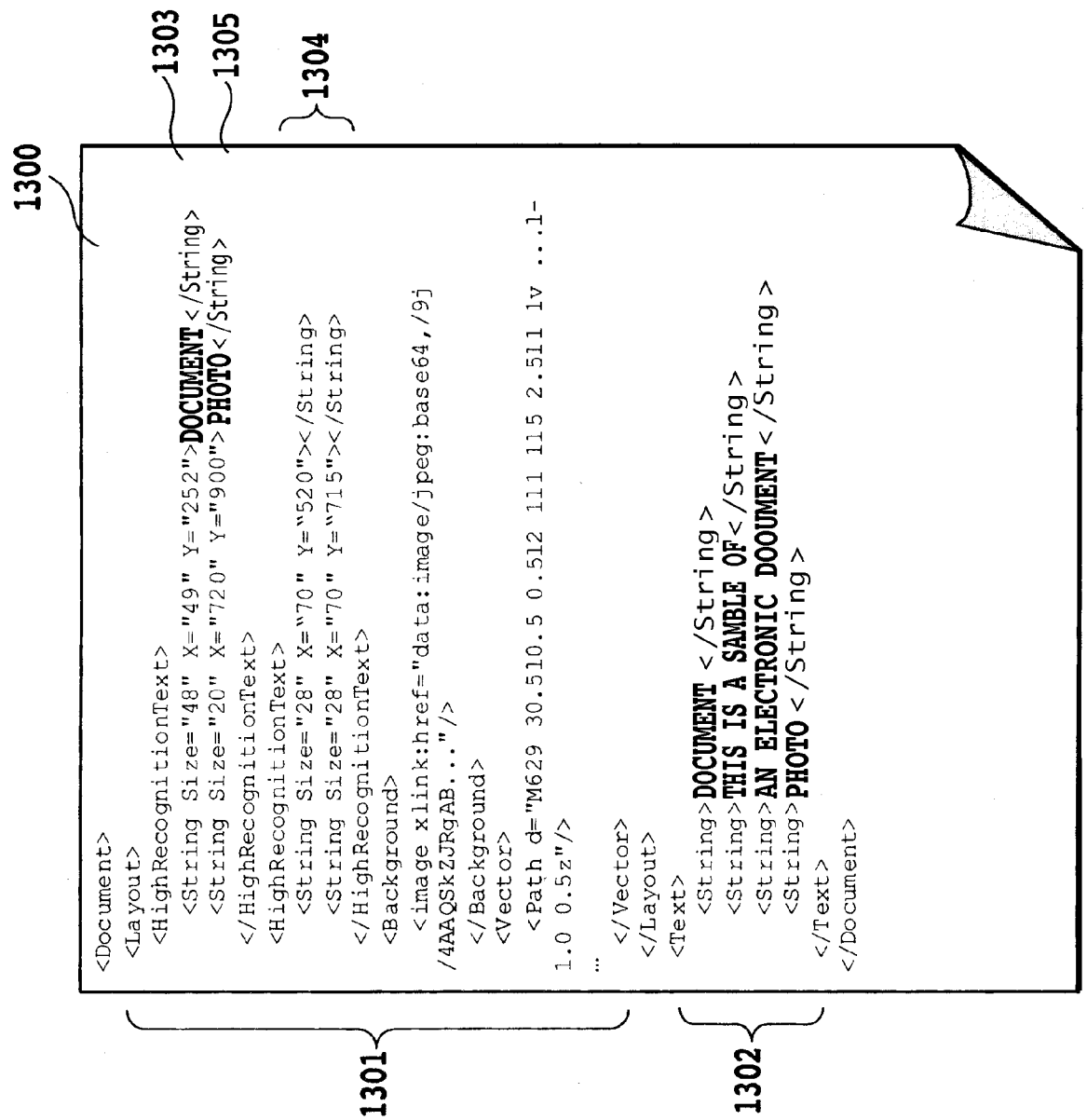
FIG. 13 illustrates a specific example of an electronic document generated for the input image of the FIG. 8 according to the third embodiment of the present invention.

Electronic document 1300 illustrated in FIG. 13 represents a specific example of the electronic document 720 generated for input image 800 of FIG. 8 according to the third embodiment.

Partition 1301 is used for storing layout editing data of electronic document 1300, which stores, as character drawing data 1 with layout (723), data 1303 and 1305 indicated in FIG. 13 corresponding respectively to character areas 801 and 803 having higher character recognition rate. Additionally, partition 1301 stores character drawing data 1 with layout as being data 1304 shown in FIG. 13 corresponding to character area 802 having lower character recognition rate with character code information eliminated.

An Example Screen by a Display and Edit Program

Next, an example screen processed by display and edit program 121 will be described with reference to FIG. 14 that is executed on personal computer 120 in FIG. 1 and that processes electronic document 1300 of FIG. 13 being a specific example of electronic document generated from image 800 of FIG. 8.

Figure 14:
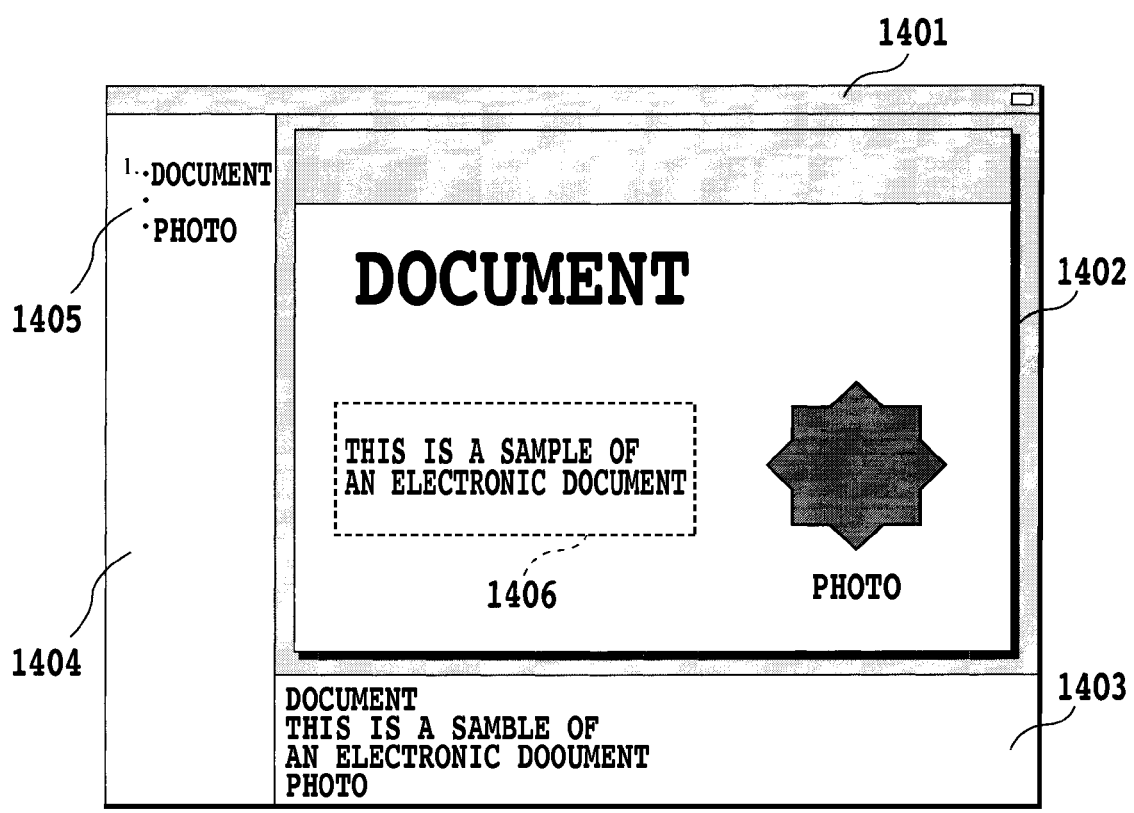
FIG. 14 illustrates an exemplary screen obtained by inputting the electronic document of the FIG. 13 into a display and edit program according to the third embodiment of the present invention.

FIG. 14 illustrates an example screen of above the electronic document 1300 fed into the display and edit program 121.

A layout editing window 1402 and a text editing window 1403 each display information similar to FIG. 11.

A summary information display window 1404 displays empty line 1405 between recognized character areas 801 and 803. The line 1405 corresponds to data in the character area 802 that was falsely-recognized as "THIS IS A SAMBLE OF AN ELECTRONIC DOCUMENT". A user can insert a string "THIS IS A SAMPLE OF AN ELECTORONIC DOCUMENT" into the empty line and round out summary information. The user can do that manually or by copying the recognition result of an original string in the text editing window 1403 for empty line 1405.

In addition, as character codes in the layout editing window is linked to the corresponding character codes in the summary information window, when characters are inserted into empty line 1405, the characters are also inserted into corresponding partition 1406 of the area for character drawing with layout. Here, characters in layout editing window are not viewable at this time since they are hidden behind a background image. However, by putting the drawing area of those characters in front of the background and the drawing area of the vector drawing data, the input string becomes available that includes character layout information, i.e., its position and size, extracted from the original image.

As described above, an image processing device according to the embodiment generates electronic data that stores character drawing data with layout whose output format is changed according to its character recognition rate. For the electronic data generated above in this manner, the display and edit program 121 daringly does not provide character information of lower character recognition rate on a layout editing window and instead does provide editable empty lines, so that users can easily edit or rebuild the electronic data. That is, modifiable lower character recognition rate data can be provided in the embodiment.

In the case of the display and edit program 121 being a Power Point program, layout editing window 602 corresponds to a slide pane, text editing window 603 corresponds to a note pane, and summary information display window 604 corresponds to an outline pane. In this case, an electronic document is generated with its data written in a layout editing data partition, such that strings having higher similarity of character recognition result are displayed in an outline pane and empty lines instead of a character area having lower similarity are displayed in the outline pane.

Various embodiments of the present invention have been described above.

It should be noted that objects of the present invention may be achieved by a system or computer device (or CPU or MPU) reading a program code from a storage medium that stores the code and executing the code. The program code embodies the steps of the flowchart illustrated in the embodiments described above. In this case, the program code itself read from the storage medium causes the computer to realize functions of the above embodiments. Therefore, the code and a computer readable storage medium storing the code also fall within the scope of the present invention.

Storage medium such as, for example, floppy® disk, hard disk, optical disk, magneto-optical disk, CD-ROM, CD-R, magnetic tape, non-volatile memory card, and ROM, etc. may be used for providing the program codes.

Additionally, functions of the embodiments previously described may be realized by a computer reading and executing a program. Furthermore, the execution of a program also encompasses an operating system running on a computer performing a part or all of actual processes based on instructions of the program.

Still further, functions of the embodiments described above may also be realized by a function enhancement board inserted into a computer or a function enhancement unit coupled to the computer. In this case, first, a program read from a storage medium will be written in a memory in the board or unit. Thereafter, a CPU in the board or unit will perform a part or all of actual processes based on instructions of the program. Functions of the embodiments previously described may also be performed by such board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171178, filed Jun. 30, 2008, which is hereby incorporated by reference herein in its entirety.

What is claimed is:

1. An image processing device which generates an electronic document according to a predetermined format, comprising:
   at least a processor and memory, cooperating to function as:
   an analyzing unit configured to analyze an image and extract character areas;
   a character recognition unit configured to recognize characters in the character areas extracted by said analyzing unit and obtain character code data of the recognition result;
   a character layout extracting unit configured to extract character layout information about the character areas extracted by said analyzing unit;
   a vectorization unit configured to obtain vector drawing data by vectorizing the character areas extracted by said analyzing unit;
   a background generation unit configured to generate a background image;
   an electronic document generation unit configured to generate an electronic document which stores the character code data as text editing data of the electronic document and stores the vector drawing data, the background image and character drawing data as layout editing data of the electronic document, the character drawing data being obtained by combining the character layout information extracted by said character layout extracting unit and the character code data,
   wherein the stored vector drawing data, the stored background image and the stored character drawing data are drawn in a layout editing pane presented by a predetermined program when the electronic document is displayed with the predetermined program, and
   wherein the stored character code data is drawn in a text editing pane presented by the predetermined program when the electronic document is displayed with the predetermined program.

2. The image processing device according to claim 1, wherein said electronic document generation unit generates the electronic document which
   stores the character drawing data having a higher character recognition rate to be drawn in both the layout editing pane and a summary pane presented by the predetermined program, and
   stores the character drawing data having a lower character recognition rate to be drawn in the layout editing pane and not drawn in the summary pane.

3. The image processing device according to claim 2, wherein the predetermined format of the electronic document is the XML format.

4. The image processing device according to claim 1, wherein said electronic document generation unit generates the electronic document such that, of the character drawing data stored as the layout editing data of the generated electronic document, the character drawing data having a lower character recognition rate is
   stored after being subjected to elimination of character code data so as to include only character layout information, and
   drawn in both the layout editing pane and a summary pane presented by the predetermined program when the electronic document is displayed with the predetermined program.

5. The image processing device according to claim 4, wherein the predetermined format of the electronic document is the XML format.

6. The image processing device according to claim 1, wherein said electronic document generation unit generates the electronic document such that the vector drawing data, the background image and the character drawing data stored as the layout editing data of the generated electronic document, when the electronic document is displayed with the predetermined program, are drawn from bottom up in the layout editing pane presented by the predetermined program in order of the character drawing data, the background image and the vector drawing data.

7. The image processing device according to claim 1, wherein the predetermined format of the electronic document is the XML format.

8. The image processing device according to claim 1, wherein the layout editing pane is a slide pane presented by the predetermined program, and wherein the text editing pane is a note pane presented by the predetermined program.

9. An image processing method executed by an image processing device for generating an electronic document according to a predetermined format, said method comprising the steps of:
   analyzing an image to extract character areas;
   recognizing characters in the character areas extracted in said analyzing step to obtain character code data of the recognition result;
   extracting character layout information about the character areas extracted in said analyzing step;
   obtaining vector drawing data by vectorizing the character areas extracted in said analyzing step;
   generating a background image; and
   generating an electronic document which stores the character code data as text editing data of the electronic document and stores the vector drawing data, the background image and character drawing data as layout editing data of the electronic document, the character drawing data being obtained by combining the character layout information extracted in said extracting step and the character code data,
   wherein the stored vector drawing data, the stored background image and the stored character drawing data are drawn in a layout editing pane presented by a predetermined program when the electronic document is displayed with the predetermined program, and
   wherein the stored character code data is drawn in a text editing pane presented by the predetermined program when the electronic document is displayed with the predetermined program.

10. A non-transitory computer-readable storage medium storing an executable program for causing a computer to execute the image processing method according to claim 9.

* * * * *